United States Patent
Nguyen et al.

(10) Patent No.: US 6,772,244 B2
(45) Date of Patent: Aug. 3, 2004

(54) QUEUING DELAY LIMITER

(75) Inventors: Hien H. Nguyen, Cambridge, MA (US); Don M. Morrier, Nashua, NH (US); Monica Wong-Chan, Concord, MA (US); Erik Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 126 days.

(21) Appl. No.: 10/139,573

(22) Filed: May 6, 2002

(65) Prior Publication Data

US 2003/0191875 A1 Oct. 9, 2003

Related U.S. Application Data

(60) Provisional application No. 60/369,706, filed on Apr. 3, 2002.

(51) Int. Cl.[7] .................... G06F 13/10; G06F 1/14
(52) U.S. Cl. .................... 710/58; 710/60; 709/101; 709/102; 709/105; 712/225
(58) Field of Search .................... 710/58, 60; 709/1, 709/100, 101, 102, 105; 712/225

(56) References Cited

U.S. PATENT DOCUMENTS

| | | | | |
|---|---|---|---|---|
| 5,095,369 A | * | 3/1992 | Ortiz et al. | 358/296 |
| 5,471,614 A | * | 11/1995 | Kakimoto | 709/102 |
| 5,628,013 A | * | 5/1997 | Anderson et al. | 709/107 |
| 6,477,558 B1 | * | 11/2002 | Irving et al. | 709/100 |

OTHER PUBLICATIONS

"Minimizing Apparent Processor Deadlock", IBM TDB, Mar. 1991, vol. 33, Issue 10A, pp. 85–86.*

* cited by examiner

*Primary Examiner*—Rehana Perveen
(74) *Attorney, Agent, or Firm*—Meyertons Hood Kivlin Kowert & Goetzel, PC; B. Noël Kivlin

(57) ABSTRACT

A method for identifying stale transactions in a queueing system with transaction processors. The method includes identifying actual processing times of transactions, maintaining a running total of deviations of processing times from a maximum expected processing time and signaling when the running total exceeds a threshold time limit.

15 Claims, 3 Drawing Sheets

US 6,772,244 B2

QUEUING DELAY LIMITER

TECHNICAL FIELD AND BACKGROUND ART

This invention relates to methods and devices for dealing with slow processing times in systems with input queues.

Input queues are used to buffer transactions that one or more transaction processors cannot immediately service. The initiator of the transaction may expect a response from the processor within a maximum amount of time called a timeout period. If the processing rate of the processor(s) is at times too slow to keep up with the flow of transactions, a response to a transaction may be sent to the initiator after the timeout period. After the timeout period, the initiator may no longer expect a response from the transaction request and receipt of a response may cause the system to crash. Even when the initiator has prepared for the possibility of such delayed responses, these delayed responses can lead to degraded system performance.

SUMMARY OF THE INVENTION

In an embodiment of the invention, a method for reducing the incidence of stale transactions in a queuing system is provided. Deviations from a maximum expected processing time ("MEPT") for processing a transaction are summed and compared to a threshold time. When the sum of deviations exceeds the threshold time, a response such as discarding transaction request in an input queue is initiated.

In a further embodiment of the invention, additional steps are taken to ensure that transactions that arrive in an input queue after the system has been idle for a period of time are not discarded. Such steps may include allowing the sum of time deviations of to decay as a function of time when the input queues are empty. Alternatively, the sum of deviations may decay when the input queues are empty and the transaction processors are idle. Further, the count of incoming transactions to be discarded may be set to zero when the count of transactions to be discarded has not incremented for a predetermined time period.

Embodiments of this invention advantageously eliminate or reduce the frequency with which transaction processing request responses are sent to an initiator of a transaction request after the initiator has timed out the request.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

An embodiment of the present invention facilitates dealing with situations where transaction processors in a system with an input queue cannot keep up with the flow of incoming transactions. Deviations from a maximum expected processing time ("MEPT") for processing a transaction are summed and compared to a threshold time. When the sum of deviations exceeds the threshold time, remedial procedures begin. Such remedial procedures may include discarding transactions in the input queue. In this way, the receipt by an initiator of a delayed response to a requested transaction may be eliminated or reduced in frequency.

Figure 1:
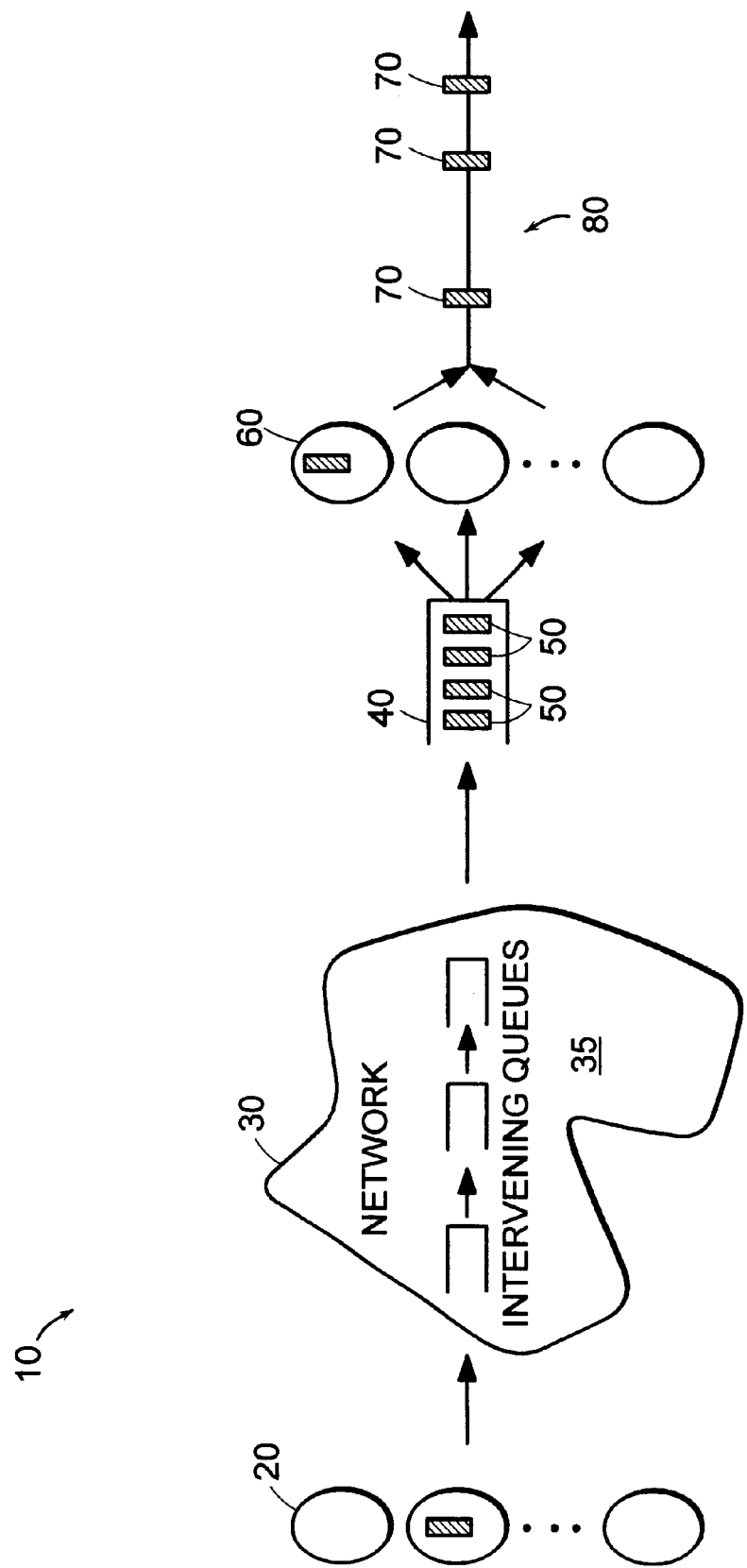
FIG. 1 is a block diagram for a queuing system according to an embodiment of the invention.

FIG. 1 shows a queuing system 10 according to an embodiment of the invention. A number of initiators 20 send transaction requests to one or more transaction processors 60. The transactions may be communicated to the processors over a network 30 that contains intervening queues 35. The transactions enter an input queue 40 that can buffer a number of transactions 50. When a processor 60 becomes idle, the processor services the transaction at the head of the queue 40. A transaction response 70 may be returned to the initiator 20 in an output stream 80.

Figure 2:
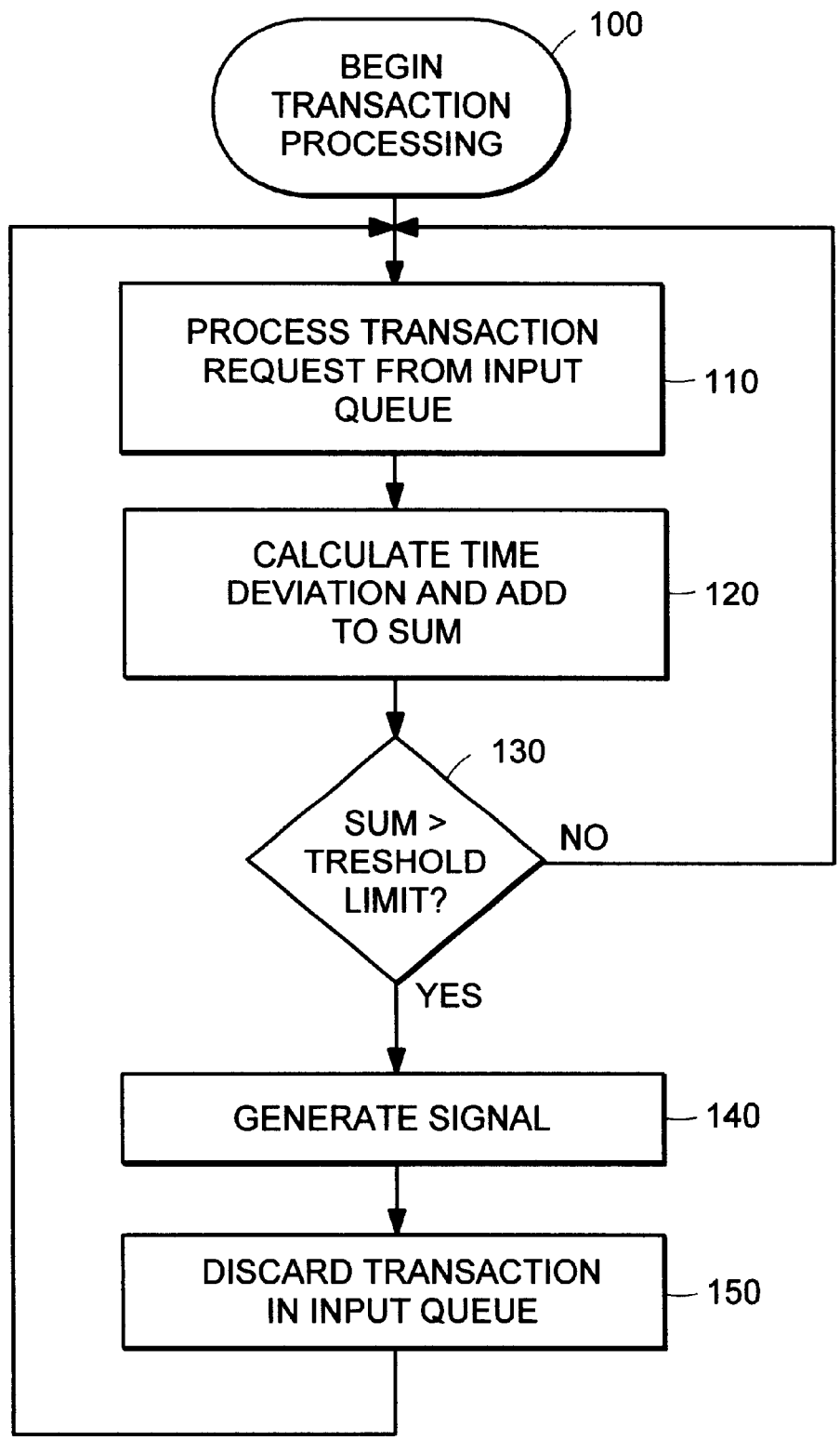
FIG. 2 is a flow chart illustrating a method of identifying stale transactions in a queueing system according to an embodiment of the invention.

In a first embodiment of the invention, a method is provided for identifying stale transactions in the queues, 35 and 40, of the system 10. As shown in FIG. 2, the method begins 100 with a transaction loaded on an input queue 40. The deviation, both positive and negative, of the processing time 110 from the MEPT for each transaction is calculated and summed. In this description and in any appended claims, "processing time" will mean the time measured from the start of processing of the transaction by any processor to the time processing is finished and the response to the initiator, if any, is placed on an output stream 80. When the sum of the deviations exceeds a threshold time 130, the system generates 140 a signal. In other embodiments of the invention, other methods of determining that the processing time for transactions has been delayed above a threshold may used. For example, without limitation, the processing time for each transaction may be summed and the result then compared with a threshold equal to the product of the MEPT and the number of transactions processed. Alternatively, the processing time for each transaction may be divided by the MEPT and the quotients may then be summed. The sum may then be compared to the number of transactions processed. All such methods are within the scope of the present invention.

In a specific embodiment of the invention, the system responds to the signal by discarding 150 transactions in the input queues. Transaction processing is then repeated. In a further specific embodiment, the number of transactions discarded is equal to the threshold time divided by the MEPT. A time equal to the threshold time may then be subtracted from the sum of deviations. In a specific embodiment, the threshold time is preset. The threshold time may be preset to an integer multiple of the MEPT or to any other number. In another specific embodiment, the threshold time is set adaptively. In a specific embodiment of the invention, the sum of deviations is constrained to non-negative values.

In a specific embodiment, the signal may cause the system 10 to generate a response. The response to the signal may be one or more of a negative acknowledgement returned to the initiator, generation of an error code and generation of a retry request.

Figure 3:
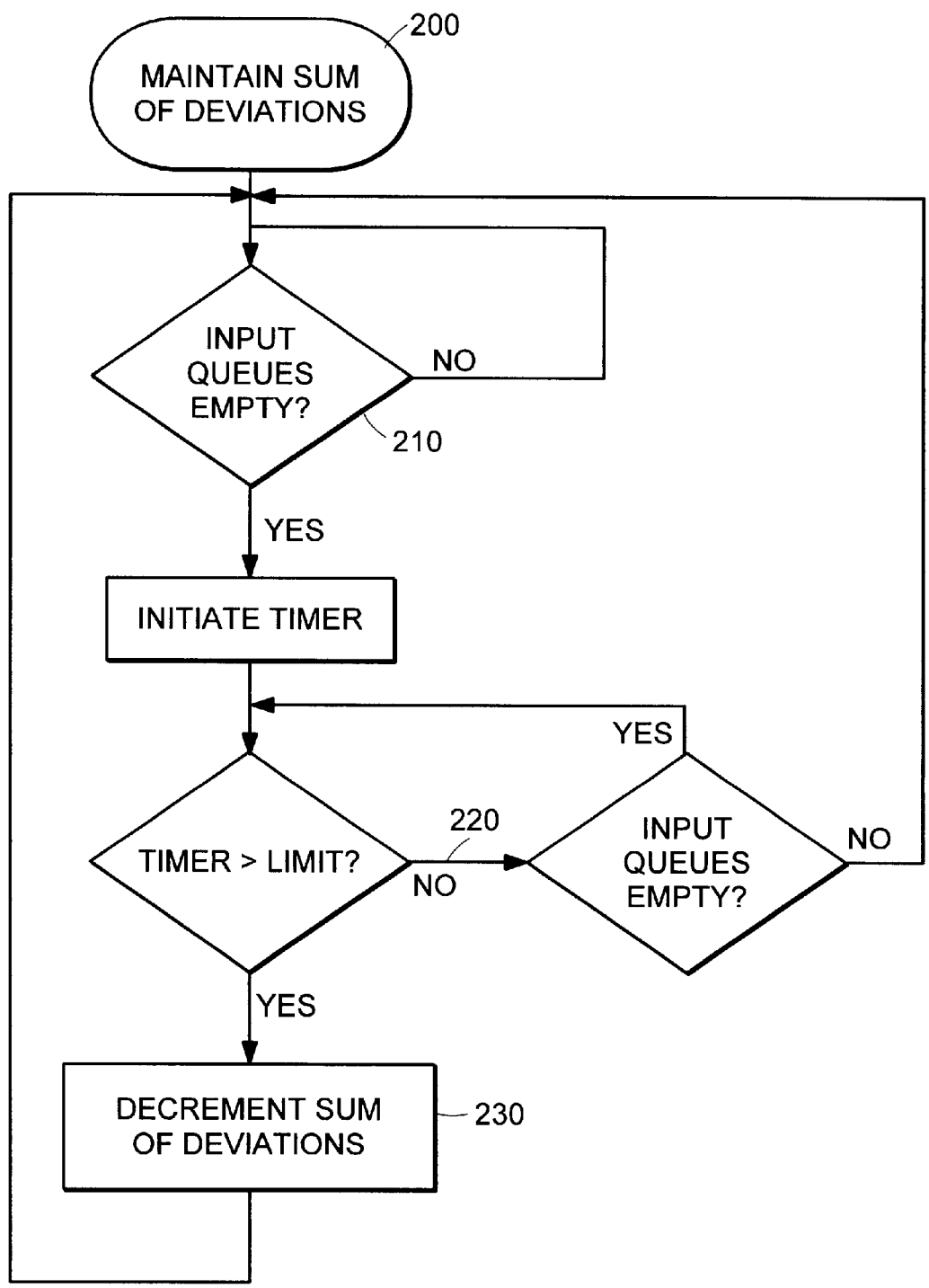
FIG. 3 is a flow chart illustrating reducing the sum of deviations of processing time when the input queues have been empty for a predetermined period.

In another variation of the first embodiment of the invention, as shown in FIG. 3, when the input queues are empty 210, the sum of deviations is decremented at a programmable rate 220. For example, the sum of deviations of processing time may be decremented 230 by one MEPT every "N" consecutive MEPT time intervals that the input queues are empty, where "N" is 1, 2, 3 . . . In a further specific embodiment, the sum of deviations is decremented according to a programmable decay when the input queues are empty, the processors are all idle and no transactions are currently scheduled to be discarded. In a further specific embodiment, the sum of deviations is decremented when the input queues are empty and the processors are idle.

In another embodiment, a "discard count" of the number of transactions to be discarded is maintained, since discarding transactions requires a finite time. The discard count will not be incremented above the maximum number of transactions that the input queues, 35 and 40, can hold. The discard count will be decremented for each transaction that has been removed from an input queue. If no transactions are waiting in an input queue, 35 and 40, then the discard count may be set to zero. This action may be desirable to eliminate the situation where the discard count is non-zero, but the system 10 may be ready to process incoming transactions. If the discard count is not decremented in this situation, the next transaction sent by an initiator 20 may be discarded even though the queuing system 10 can process transactions.

In a further specific embodiment of the invention, a discard expiration timer may be set to run wherever the discard count is non-zero. The discard count may be reset to zero when the discard expiration timer exceeds a discard expiration timer limit. The discard expiration timer is reset whenever the discard count is incremented, signaling that the time for servicing transactions has again exceeded the threshold time. The discard expiration timer limit may be set, for example, to a value slightly larger than any initiator's timeout value. This embodiment advantageously sets the discard count to zero whenever the sum of time deviations from the MEPT has not exceeded the threshold time for at least long enough for any initiator's transaction request to have either timed out or to have been processed. This embodiment advantageously deals with situations where information about the number and state of the intervening network queues 35 may not be available. In this embodiment, the expiration of the discard expiration timer serves as a proxy for the system being ready to process additional transactions.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

The present invention may be embodied in other specific forms without departing from the true scope of the invention. The described embodiments are to be considered in all respects only as illustrative and not restrictive.

What is claimed is:

1. A method for identifying stale transactions in a queuing system including at least one initiator, at least one processor and an input queue, the method comprising:

measuring a processing time for a plurality of transactions;

determining a sum of deviations from a maximum expected processing time for each transaction of the plurality of transactions; and signaling when the sum exceeds a threshold time.

2. A method according to claim 1, the method further comprising:

discarding transactions when the sum of deviations exceeds the threshold time.

3. A method according to claim 1, the method further comprising:

sending to at least one initiator at least one of a negative acknowledgement, an error code and a retry request, when the sum of deviations exceeds the threshold time.

4. A method according to claim 2 wherein discarding transactions includes subtracting the threshold time from the sum of deviations.

5. A method according to claim 1, the method further comprising:

decreasing the sum of deviations when the input queue is empty.

6. A method according to claim 2, wherein discarding transactions includes incrementing a discard count by the number of transactions to be discarded and decrementing the discard count when a transaction is discarded.

7. A method according to claim 6 further comprising setting the discard count to zero when a discard expiration time exceeds a discard expiration time limit.

8. A computer program product for use on a computer system for identifying stale transactions, the system including at least one initiator, at least one processor and an input queue, the computer program product comprising a computer usable medium having computer readable program code thereon, the computer readable program code including program code for:

measuring a processing time for a plurality of transactions;

determining a sum of deviations from a maximum expected processing time for each transaction; and signaling when the sum exceeds a threshold time.

9. A computer program product according to claim 8, further including program code for:

subtracting the threshold time from the sum and discarding transactions when the sum of deviations exceeds the threshold time; and incrementing a discard count of the number of transactions to be discarded, when the sum of deviations exceeds the threshold time and decrementing the discard count when a transaction is discarded.

10. A computer program product according to claim 9, further including code for:

decreasing the sum when each input queue is empty, each processor is idle and the discard count is zero.

11. A device for identifying stale transactions in a queuing system including at least one initiator, the device comprising:

at least one input queue;

at least one processor;

logic for measuring a processing time for a plurality of transactions;

logic for determining a sum of deviations from a maximum expected processing time for each transaction of the plurality of transactions; and logic for signaling when the sum exceeds a threshold time.

12. A device according to claim 11, the device further comprising:

logic for subtracting the threshold time from the sum and discarding transactions when the sum of deviations exceeds the threshold time; and logic for incrementing a discard count of the number of transactions to be discarded when the sum of deviations exceeds the threshold time and decrementing the discard count when a transaction is discarded.

13. A method according to claim 1, the method further comprising:

discarding a selected transaction from the input queue in response to the sum of deviations exceeding the threshold time.

14. A computer program product according to claim 8, further including program code for:

discarding a selected transaction from the input queue in response to the sum of deviations exceeding the threshold time.

15. A device according to claim 11, the device further comprising:

logic for discarding a selected transaction from the input queue in response to the sum of deviations exceeding the threshold time.

* * * * *